United States Patent [19]

Amend

[11] Patent Number: 4,513,947
[45] Date of Patent: Apr. 30, 1985

[54] GEOTHERMAL VALVE

[75] Inventor: William E. Amend, Yorba Linda, Calif.

[73] Assignee: Union Oil Company of California, Los Angeles, Calif.

[21] Appl. No.: 514,979

[22] Filed: Jul. 18, 1983

[51] Int. Cl.³ ............................................. F16K 25/00
[52] U.S. Cl. .................................... 251/174; 251/159; 251/328; 251/368
[58] Field of Search ............... 251/171, 174, 159, 328, 251/368

[56] References Cited

U.S. PATENT DOCUMENTS

| | | | |
|---|---|---|---|
| 3,220,694 | 11/1965 | Eschbaugh | 251/174 |
| 3,266,525 | 8/1966 | Wolter | 251/174 X |
| 3,458,172 | 7/1969 | Burrows | 251/368 X |
| 4,126,295 | 11/1978 | Natalizia | 251/368 X |
| 4,278,236 | 7/1981 | Janich | 251/174 X |
| 4,327,893 | 5/1982 | Bachmann | 251/174 X |
| 4,431,159 | 2/1984 | Stubbs | 251/368 X |

FOREIGN PATENT DOCUMENTS 2945153  5/1981  Fed. Rep. of Germany ...... 251/174

*Primary Examiner*—Harold W. Weakley
*Attorney, Agent, or Firm*—Dean Sandford; Gregory F. Wirzbick; Robert J. Baran

[57] ABSTRACT

A valve of special usefulness in handling solids-containing or solids-producing fluids comprises a floating valve seat comprised of inner and outer rings, the outer ring being fixed within the valve body and the inner ring being urged directly from the outer ring by one or more springs against a gate element controlling the flow of fluids through the valve. The springs are housed within chambers provided by aligned cavities in the inner and outer rings while similarly aligned notches house a bellows or accordian shaped flexible metal seal. The flexible metal seal is in contact with the fluid but prevents entry of fluid between the rings to the spring; thus, the action of the inner and outer rings is not impeded by solids depositing from the fluid.

6 Claims, 3 Drawing Figures

GEOTHERMAL VALVE

BACKGROUND OF THE INVENTION

1. Field of the Invention

This invention relates to valves which are useful for controlling the flow of solids-containing or solids-producing fluids, especially corrosive geothermal fluids. In particular, this invention contemplates valves which are resistant to jamming caused by deposits that interfere with the movement of the valve seat.

2. Description of the Art

It is common in the construction of gate valves, ball valves and like valves having movable valve members to employ valve seats that are accommodated in recesses provided in the valve body and which are spring-urged towards the movable valve member to provide a fluid-tight seal between the movable valve member and the valve seat. One difficulty that has been experienced with such valves is that the sediment or deposits that tend to accumulate behind the valve seat interferes with the movement and the position of the valve seat. Such interference causes the sticking of the movable valve member and inadequate sealing. In certain instances the sediment or deposits behind the valve seat will cement the movable valve member and valve seat together. The cemented or frozen valve in such cases may be freed only with great exertion or destruction of the valve. Alternatively, the valve may have to be disassembled to free such frozen movable member.

In geothermal service wherein corrosive fluids are moved through valves, there is a special tendency for the brine to deposit behind the O-rings and crystallize out as salt. Crystallized salt is an especially effective cement and therefore geothermal service valves are especially difficult to design.

In the valves useful in the transport of petroleum products the sedimentation problems have been to some extent overcome by providing sediment guards to prevent the unnecessary accumulation of sediment in the valve seat recess.

In U.S. Pat. Nos. 3,121,533, 3,972,405 and 4,364,544, sediment guards are described for use in valves utilized in transport of petroleum products. In certain of these patents the sediment guards are stationary whereby they function to simply retard the deposit of sediment in seat recesses. With such stationary sediment guards, sediment eventually gets behind the valve seat. In other of the above references the sediment guards are flexible whereby contact is maintained between the valve seat and the seat recesses by virtue of the expansion and contraction movement of the sediment guard. However, these flexible sediment guards are fabricated from polymeric materials which typically have an adverse reaction to corrosive fluids, such as geothermal brine.

It therefore would be desirable to provide a valve having a guard that is not subject to deterioration in the presence of corrosive fluids and does not merely retard, but eliminates the deposition of sediment in the valve seat recesses.

Therefore it is one object of this invention to provide a valve which is useful in the presence of solids-containing or solids-producing fluids, especially corrosive fluids and in which valve materials that are subject to corrosion are not in contact with said corrosive fluids.

It is another object of the instant invention to provide a valve which eliminates the deposition of sediment between the valve seats and the seat recesses.

It is another object of this invention to provide a valve useful in the presence of flowing geothermal brines, which valve is not subject to freezing by deposition of salt from said brine in the space between the valve seats and the seat recesses.

It is another object of the instant invention to provide a spring-biased, floating or movable valve seat for use in a valve utilized in controlling the flow of corrosive fluids wherein said valve seat is easily installed in such valve and the spring is protected from freezing in the presence of corrosive fluids.

Other objects and advantages of the instant invention will be apparent after a careful reading of the specification below:

SUMMARY OF THE INVENTION

This invention provides a valve for controlling the flow of corrosive fluids, which comprises: a valve body defining a valve chamber and cylindrical inlet and outlet flow passages intersecting said valve chamber, said valve body further defining annular seat recesses about the intersection of said inlet and outlet flow passages with said valve chamber, each of said annular seat recesses being defined by a cooperative radial surface and a cylindrical surface; a gate element being movably positioned within said valve chamber and being movable between open and closed positions to control the flow of fluid through said flow passages; an annular ring being movably retained within each of said seat recesses and having a sealing surface for establishing sealing engagement with said gate element and a rear surface opposing said radial surface, said annular ring having an outside surface conforming to said cylindrical surface and an inside surface conforming to the flow passage; at least one spring engaging said radial surface and said rear surface to resiliently urge said sealing surface against said gate element; a first flexible metal seal secured to said valve body and the said inner surface; and a second flexible metal seal secured to said sealing surface and said valve body whereby said spring is fluid-tightly isolated from said corrosive fluid.

This valve is especially useful in geothermal service whereby the spring is prevented from freezing by the deposition or crystallization of salt from the geothermal brine. Preferably, at least said first flexible metal seal is a compressible metallic bellows.

BRIEF DESCRIPTION OF THE INVENTION

The invention will be more readily understood by reference to the drawings wherein like numerals refer to like elements and where FIG. 1 is a longitudinal partial cross-sectional view of a preferred embodiment of the valve of this invention;

DETAILED DESCRIPTION OF THE INVENTION

Figure 1:
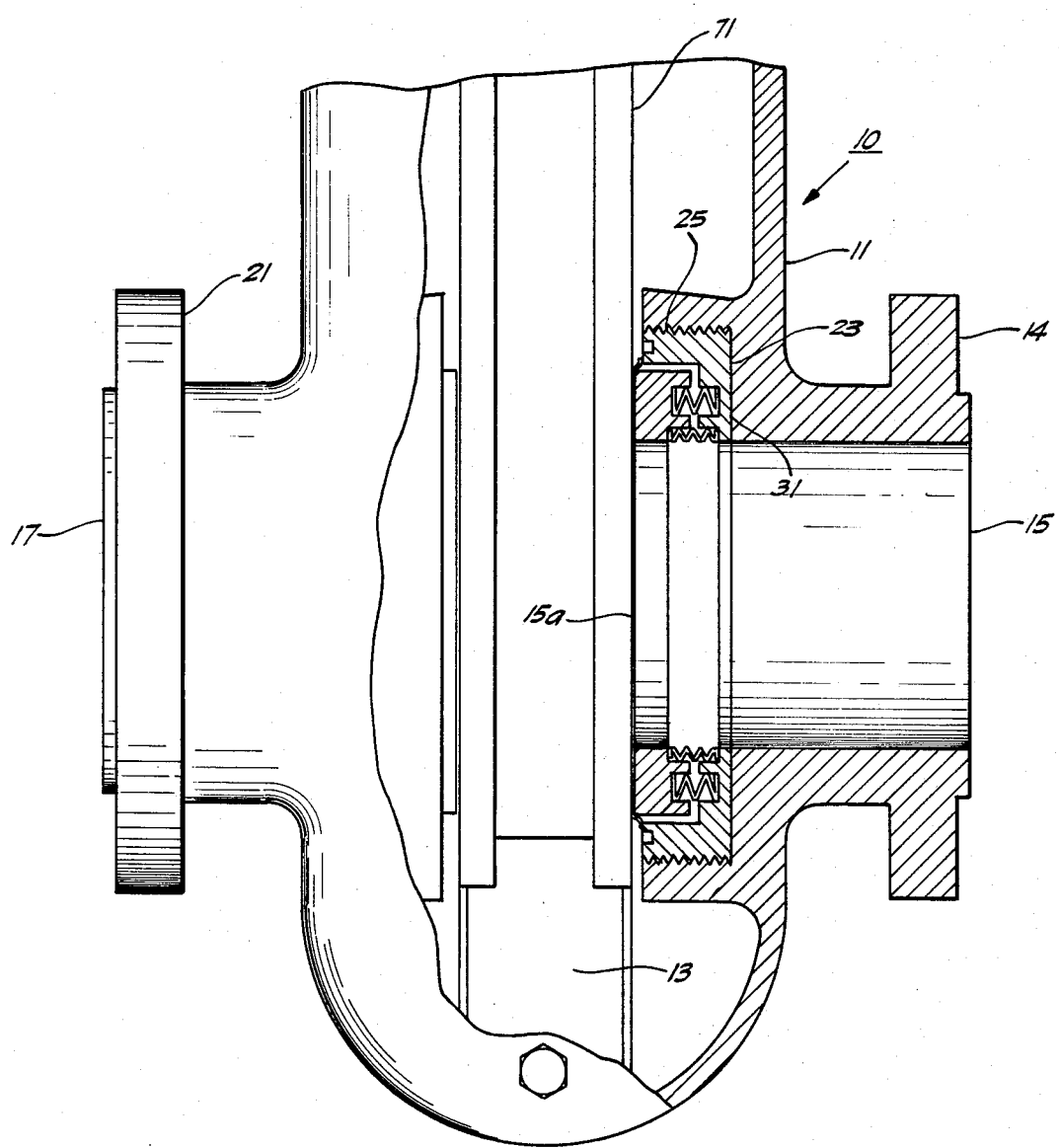

Referring now to FIG. 1 of the drawing, a gate valve is shown generally at 10 which is of the short gate type and which incorporates the floating valve seat of this invention. However, although the gate valve 10 is shown to incorporate a short gate, it is not any way intended to limit the present invention to the particular valve construction shown in FIG. 1. The floating valve seat of this invention may be used in valves that utilize both ported and non-ported gates. The present invention may also be used in a ball valve without departing from the spirit and scope of this invention.

As shown in FIG. 1 gate valve 10 incorporates a valve body 11 which defines a valve chamber 13 and further defines an inlet flow passage 15 and an outlet flow passage 17 which intersects with valve chamber 13 at, for example, 15a. The intersection of the outlet flow passage with valve chamber 13 is not shown but is substantially similar to the intersection of valve chamber with the inlet chamber. Moreover, while not specifically illustrated, the outlet passage may be provided with a similar annular recess and floating valve seat as is described below for the inlet passage. The valve body may also be provided with flanges 14 and 21 for affixing the valve to a pipeline, for example, a geothermal pipeline.

The valve body also defines an annular recess 23 about the intersection of the inlet flow passage with the valve chamber. This annular recess is provided with threads 25 for receiving a floating valve seat. The floating valve seat is shown generally at 31 is more easily seen in FIG. 2.

The valve 10 is also provided with a movable gate 71, which is affixed to a valve stem not shown. A valve stem may be interconnected with a valve handle for moving the gate between an open and closed position in the valve chamber. As shown, the gate is a short gate type which when moved upward will open the valve and permit passage of a fluid from the inlet passage through the valve chamber and out the outlet passage. As noted above a ported gate may be utilized in place of the short gate or a ball valve may be substituted therefor. In a ported gate valve, the gate will have a through conduit which will register with the inlet and outlet passage when the valve is in the open position.

Figure 2:
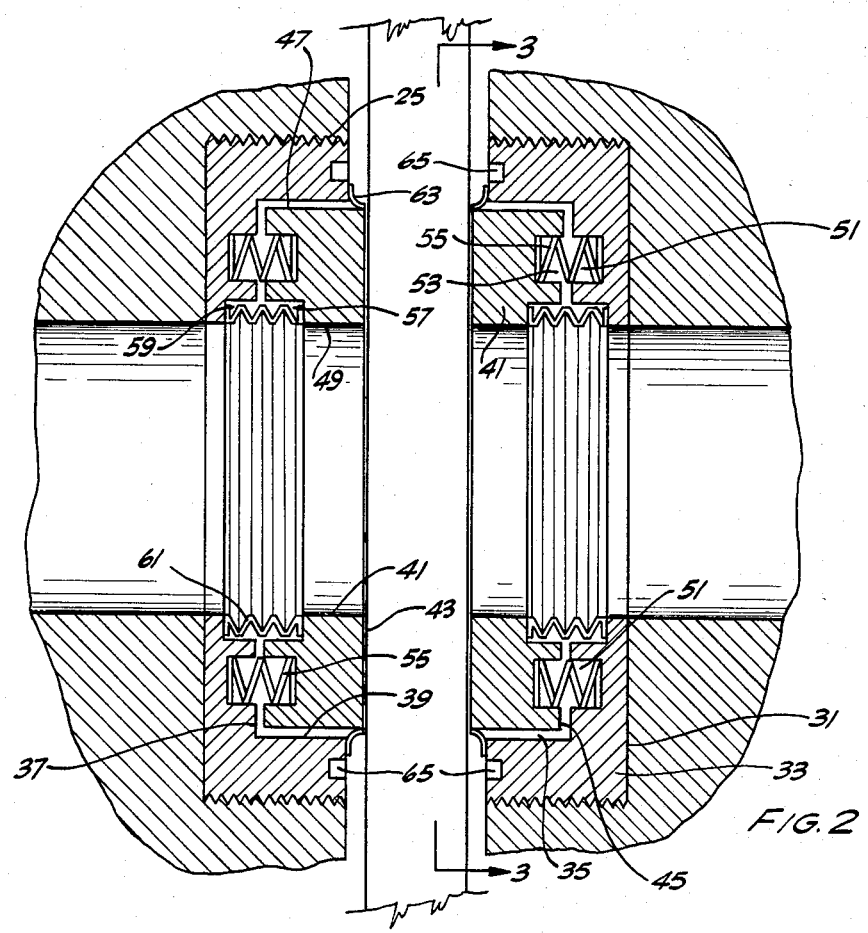
FIG. 2 is an enlarged, fragmentary sectional view of the valve of FIG. 1, showing the floating valve seat of the inlet and outlet flow passages of the valve.
Figure 3:
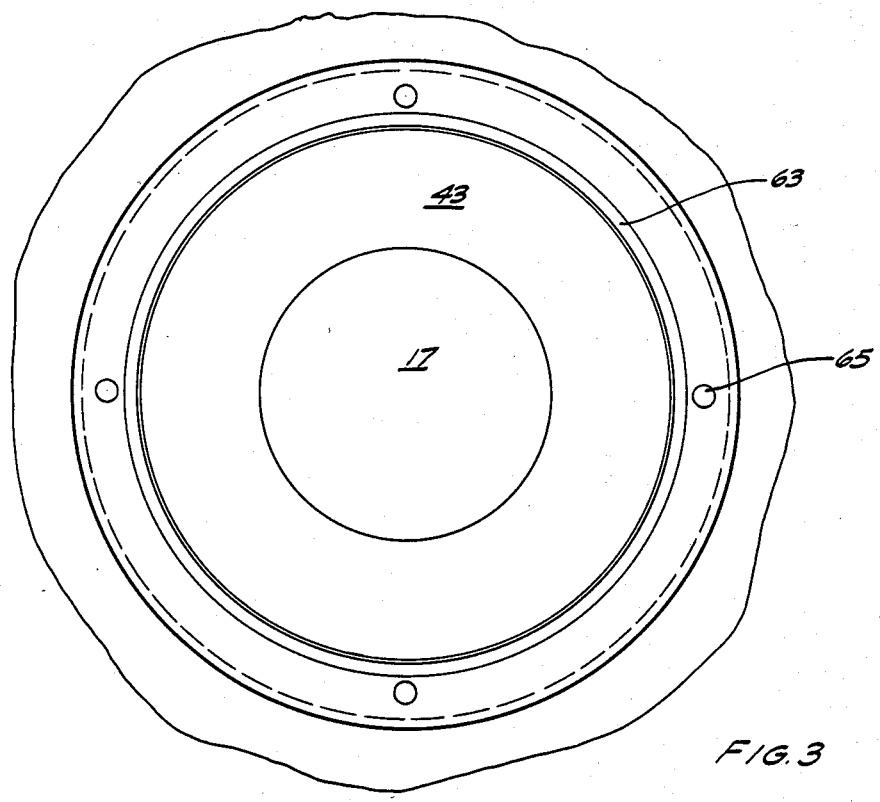
FIG. 3 shows the floating valve seat of this invention and taken along line 3—3 of FIG. 2.

As shown in FIG. 2 floating valve seat 31 comprises an outer annular ring 33 which is adapted to be threaded into the annular recess of the valve body. The outer annular ring is provided with an annular recess 35 which is defined by cooperating radial surface 37 and cylindrical surface 39. The floating valve seat also comprises an annular ring 41 which is movable within said annular recess and has a sealing surface 43 for establishing sealing engagement with the gate element and a radial rear surface 45 which opposes the cooperative radial surface 37 of the outer ring. The inner ring also has an outside surface 47 which conforms to the cylindrical surface of the outer ring and an inside surface 49 which conforms to the intersection of the inlet flow passage and the valve chamber. As shown, the inner ring and the outer ring have aligned cavities 51 and 53, respectively, which may receive a spring element 55. The aligned cavities may take the form of blind bores in which case at least three must be provided to uniformly urge the inner ring against the gate element. In this embodiment the three helical compression springs are equi-axially spaced in relation to the outer ring and the inner ring.

Alternatively, the aligned cavities can be continuous grooves and a single wave spring can be provided therein to uniformly urge the inner ring against the gate element.

The inner ring and outer ring are also provided with aligned notches 57 and 59 in which are affixed the flexible metal seal 61. As shown the flexible metal seal is, preferably, an accordian shaped member or a bellows which may be affixed to the inner and outer ring by welding, etc. A bellows is the preferred configuration for the flexible metal seal because it provides greater flexibility, at an equivalent cross sectional thickness, than other configurations of flexible metal seals.

The flexible metal seal allows the inner ring to move or float from the force of the spring and the gate element, while protecting the spring element from contacting fluids flowing through the flow passage.

The flexible metal seal 61 may also exert force upon the inner ring to assist in the floating function; however, it is preferred that the spring provides the prime urging force against the gate element.

A similar or different flexible metal seal 63 is affixed to the sealing surface 43 and said outer annular ring 33 which in cooperation with said flexible metal seal 61, serves to fluid-tightly isolate spring element 55 from the corrosive fluid flowing through the valve chamber and flow passages. In the valve seat of this invention the spring function and the sealing function are separated (unlike the valve seat of U.S. Pat. No. 4,208,035); therefore, the material utilized in providing the spring element may be selected on the basis of its spring constant (or resilience) and the material utilized in providing the flexible metal seals may be selected on the basis of its corrosion resistance and/or its ability to fluid-tightly isolate said spring element. Thus, the flexible metal seals are made up of any metallic material which is resistant to the corrosive fluid flowing through the valve. In geothermal service a particularly useful material is a high nickel alloy, such as Inconel TM, or a chromium, molybdenum, and nickel alloy or a titanium or zirconium alloy.

The outer ring of the floating valve seat is also provided with a plurality of notches 65 which are utilized for removal and insertion of the valve seat in the valve body by means of a spanner wrench.

In geothermal valves the materials of construction of the valve and the floating valve seat of the instant invention are important. For example, the spring element will be a metal which is resistant to degradation at the temperatures of the geothermal brine. For example, spring steel is a suitable metal for preparing such spring elements. In any event, polymeric spring elements are not suitable in view of their tendency to degrade at the temperatures of geothermal brines. The sealing surface of the inner ring may be any hard-facing alloy, such as a cobalt nickel alloy. A particularly preferred alloy for use as the sealing surface is Stellite TM, a cobalt based alloy which comprises about 54 percent cobalt, 33 percent chromium, 6 percent tungsten, 3 percent nickel and 3 1/2 percent iron.

The movable gate may be a carbon steel which is hard-faced with Stellite TM where it contacts the sealing surface of the floating valve seat. The outer ring is typically a carbon steel since under the usual condition of operation of the valve it will not contact the movable gate, and thus the wearing thereof is much less than the wearing of the sealing surface.

While particular embodiments of the invention have been described it will be understood of course that the invention is not limited thereto. Since many obvious modifications can be made, it is intended to include within this invention any such modifications as will fall within the scope of the intended claims.

I claim:

1. A valve for controlling the flow of geothermal brines, which comprises:
   (a) a valve body defining a valve chamber and cylindrical inlet and outlet flow passages intersecting said valve chamber, said valve body further defining annular seat recesses about the intersection of said inlet and outlet flow passages and said valve chamber, each of said annular seat recesses being defined by a cooperative radial surface and a cylindrical surface,
   (b) a gate element comprised of carbon steel having a cobalt alloy face and being movably positioned within said valve chamber and being movable between open and closed positions to control the flow of fluid through said flow passages;
   (c) an annular ring being movably retained within each of said seat recesses and having a cobalt alloy sealing surface for establishing sealing engagement with said gate element and a rear surface opposing said radial surface, said annular ring having an outside surface conforming to said cylindrical surface and an inside surface conforming to the flow passage;
   (d) at least three helical compression springs seated in cavities equi-axially spaced about said annular ring to resiliently urge said sealing surface against said gate element;
   (e) a first flexible metal seal configured as an accordian-shaped member and secured to said valve body and the said inner surface, said metal seal being a high nickel alloy; and
   (f) a second flexible metal seal secured to said valve body and said sealing surface, whereby said spring is fluid-tightly isolated from said flowing corrosive fluid.

2. The valve of claim 1 wherein said second flexible metal seal is configured as an accordian shaped member.

3. The valve of claim 2 wherein said second flexible metal seal is a high nickel alloy.

4. A floating valve seat for use in a valve utilized in controlling the flow of geothermal brines, wherein said valve comprises a valve body defining a valve chamber and cylindrical inlet and outlet flow passages intersecting said valve chamber, said valve body further defining annular seat recesses about the intersection of the inlet and outlet flow passages and the valve chamber, each of said annular seat recesses being defined by a cooperating radial surface and a cylindrical surface, and a carbon steel gate element having a cobalt alloy face being movably positioned within said valve chamber and being movable between open and closed positions to control the flow of fluid through said flow passages, which comprises:
   (a) an outer annular ring being adapted to be secured to an annular recess of said valve body and having an annular recess being defined by a cooperating radial surface and a cylindrical surface;
   (b) an inner ring being movably retained within said outer ring recess and having a cobalt alloy sealing surface for establishing sealing engagement with said gate element and a rear surface opposing the radial surface of said outer ring, said inner ring having an outside surface conforming to said cylindrical surface of said outer ring and an inside surface conforming to the flow passages;
   (c) at least three helical compression springs seated in corresponding cavities in said outer annular ring and said inner ring, said cavities being equi-axially spaced about said annular ring and said inner ring to resiliently urge said sealing surface against said gate element;
   (d) a first flexible metal seal configured as an accordian-shaped member and secured to said outer ring and said inner surface, said metal seal being a high nickel alloy; and
   (e) a second flexible metal seal secured to said sealing surface and said outer ring, whereby said spring is fluid-tightly isolated from said flowing corrosive fluid.

5. The valve seat of claim 4 wherein said second flexible metal seal is configured as an accordian-shaped member.

6. The valve seat of claim 5 wherein said second flexible metal seal is a high nickel alloy.

* * * * *